United States Patent
Hoshino et al.

(10) Patent No.: US 8,442,569 B2
(45) Date of Patent: May 14, 2013

(54) RADIO RECEPTION APPARATUS, RADIO TRANSMISSION APPARATUS, AND RADIO COMMUNICATION METHOD

(75) Inventors: Masayuki Hoshino, Kanagawa (JP); Akihiko Nishio, Kanagawa (JP); Seigo Nakao, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 144 days.

(21) Appl. No.: 13/202,600

(22) PCT Filed: Jan. 29, 2010

(86) PCT No.: PCT/JP2010/000564
§ 371 (c)(1),
(2), (4) Date: Aug. 22, 2011

(87) PCT Pub. No.: WO2010/106725
PCT Pub. Date: Sep. 23, 2010

(65) Prior Publication Data
US 2011/0300890 A1 Dec. 8, 2011

(30) Foreign Application Priority Data

Mar. 16, 2009 (JP) .................. 2009-063119

(51) Int. Cl.
*H04B 7/00* (2006.01)
(52) U.S. Cl.
USPC ........ 455/509; 455/450; 455/451; 455/452.1; 375/E7.141
(58) Field of Classification Search ............... 455/422.1, 455/450–453, 456.2, 464, 509, 510; 370/395.41, 370/332; 375/E7.141
See application file for complete search history.

(56) References Cited

U.S. PATENT DOCUMENTS 6,523,065 B1 * 2/2003 Combs et al. ............... 709/226
6,865,393 B1 * 3/2005 Baum et al. ............... 455/452.2
(Continued)

FOREIGN PATENT DOCUMENTS

WO 2007/091519 A1 8/2007
WO 2009/139383 A1 11/2009

OTHER PUBLICATIONS

Catt, et al., 3GPP TSG RAN WG1 #56, R1-091066, "Way forward on downlink reference signals for LTE-A", Feb. 9, 2009-Feb. 13, 2009.
(Continued)

*Primary Examiner* — Dominic E Rego
(74) *Attorney, Agent, or Firm* — Pearne & Gordon LLP (57) ABSTRACT

In a case where a second reference signal for a second communication system is transmitted in addition to a first reference signal for a first communication system, resources that affect a reception apparatus compatible only with the first communication system can be minimized, and the throughput can be prevented from being deteriorated. As resources for a reference signal CSI-RS, DVRB resources in which a resource unit defined in a frequency-time domain is divided in a time direction and distributedly allocated at predetermined frequency intervals are used and CSI-RS is allocated in a resource ID of a part of DVRB resources and transmitted when a reference signal 4RS for LTE is transmitted to a reception apparatus in addition to transmitting CSI-RS for LTE-A. The reception apparatus receives CSI-RS allocated in DVRM resources on the basis of DVRB setting information for CSI-RS, measures channel quality such as CQI, PMI or RI by using CSI-RS, and transmits and reports feedback information containing channel quality information to a transmission apparatus.

12 Claims, 8 Drawing Sheets

U.S. PATENT DOCUMENTS

| | | | | |
|---|---|---|---|---|
| 7,929,962 | B2* | 4/2011 | Bachl et al. | 455/424 |
| 7,940,740 | B2* | 5/2011 | Krishnamurthy et al. | 370/344 |
| 8,238,299 | B2* | 8/2012 | Lee et al. | 370/329 |
| 8,363,606 | B2* | 1/2013 | Montojo et al. | 370/329 |
| 2004/0064558 | A1* | 4/2004 | Miyake | 709/226 |
| 2004/0082338 | A1* | 4/2004 | Norrgard et al. | 455/452.2 |
| 2005/0153720 | A1* | 7/2005 | White et al. | 455/500 |
| 2006/0211426 | A1* | 9/2006 | Costa et al. | 455/450 |
| 2008/0186939 | A1* | 8/2008 | Kim et al. | 370/343 |
| 2009/0129362 | A1 | 5/2009 | Higuchi et al. | |
| 2009/0221294 | A1* | 9/2009 | Breuer et al. | 455/450 |
| 2010/0272038 | A1* | 10/2010 | Hamalainen et al. | 370/329 |
| 2011/0085536 | A1 | 4/2011 | Taoka et al. | |
| 2011/0134867 | A1* | 6/2011 | Lee et al. | 370/329 |
| 2011/0235607 | A1* | 9/2011 | Haustein et al. | 370/329 |

OTHER PUBLICATIONS

NTT Docomo, 3GPP TSG RAN WG1 #56bis, R1-090317, "Support of DL Higher-Order MIMO Transmission in LTE-Advanced", Jan. 12, 2009-Jan. 16, 2009.

International Search Report for PCT/JP2010/000564 dated Apr. 26, 2010.

* cited by examiner

RADIO RECEPTION APPARATUS, RADIO TRANSMISSION APPARATUS, AND RADIO COMMUNICATION METHOD

TECHNICAL FIELD

The present invention relates to a radio reception apparatus, a radio transmission apparatus, and a radio communication method which are applicable to a radio communication system such as a cellular system.

BACKGROUND ART

In a radio communication system such as a cellular system, a reference signal for obtaining various indexes of a propagation channel and a transmission signal is introduced. Such a reference signal (RS) is also used, for example, in LTE (Long Term Evolution) for a next generation communication system studied in 3GPP (3rd Generation Partnership Project) which is an international standards body for mobile communication. In downlink communication from a base station to a user equipment, a reference signal which is transmitted from the transmission apparatus (base station) to the reception apparatus (user equipment) is used as principal uses in (1) estimation of a propagation channel for demodulation, (2) a quality measurement for the frequency scheduling or the adaptive MCS (Modulation and Coding Scheme) control, or the like. In LTE, in a multi-antenna system for applying MIMO (Multiple Input Multiple Output), a reference signal is transmitted in a predetermined radio resource unit.

In LTE-advanced (hereinafter, referred to as LTE-A) which is a communication system that advances LTE, in order to achieve further sophistication, introduction of high-order MIMO (for example, transmission 8 antenna) or cooperative multipoint transmission/reception (CoMP) is studied. In addition to the reference signal (first reference signal) which is studied in LTE, therefore, an additional reference signal (second reference signal) is necessary for LTE-A, and a method of transmission is discussed.

As shown in Non-patent Literature 1, for example, two kinds of reference signals respectively for the above-described uses are studied in LTE-A.

(1) Demodulation RS: one for PDSCH (Physical downlink shared channel) demodulation, to which the same layer number as that of PDSCH and Precoding are applied, and specific to User Equipment (UE) (UE-specific).

(2) CSI-RS: one for CSI (Channel State Information) observation, (as CSI, there are CQI (Channel Quality Indicator), PMI (Precoding Matrix Indicator), RI (Rank Indicator), and the like), to which Precoding is not applied, and specific to a cell (cell-specific).

However, the use is not exclusive. Specifically, the argument is advanced on the assumption that CSI-RS may be used in the use of (1).

Figure 7:
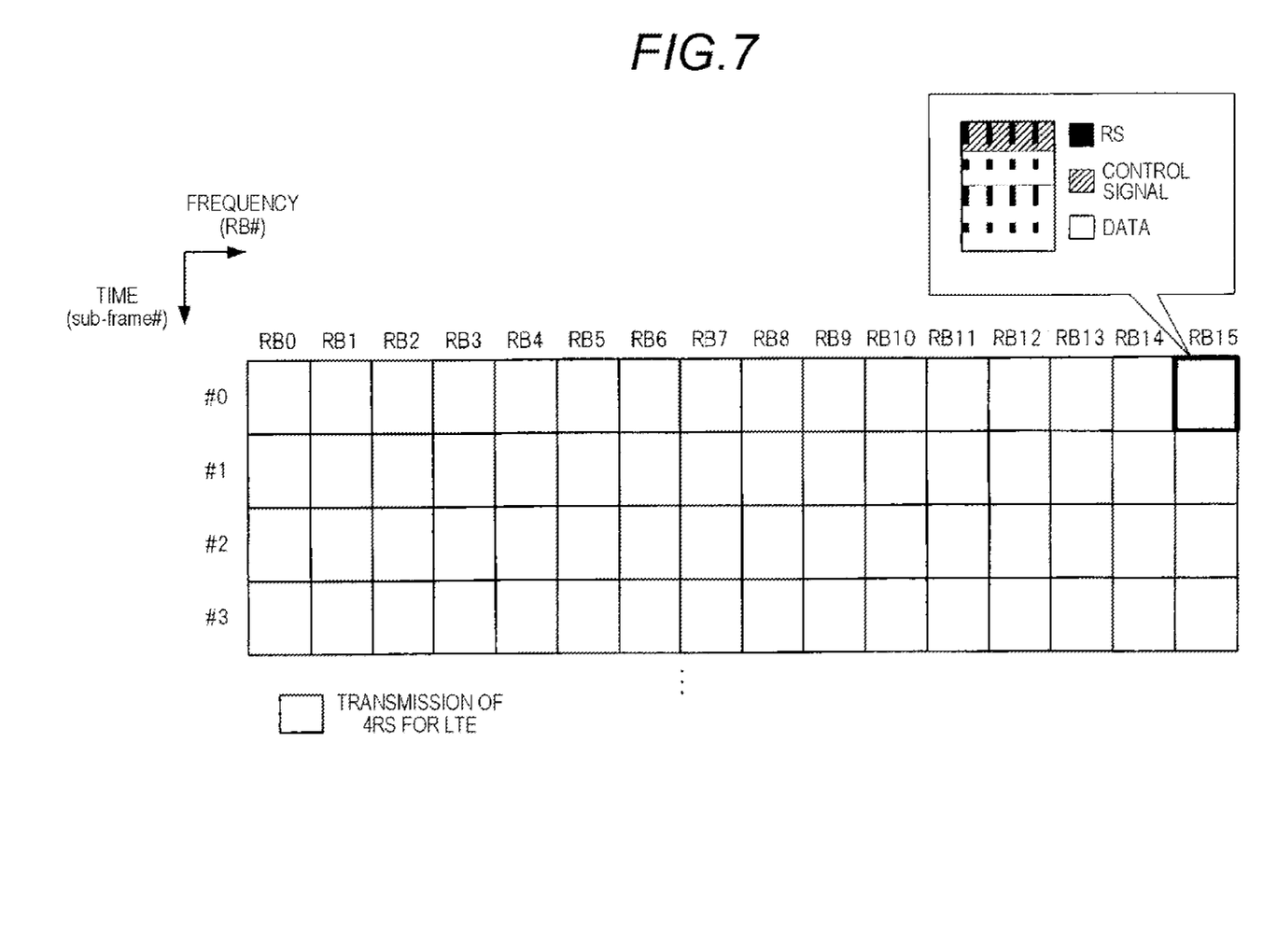
FIG. 7 is a diagram showing a configuration example of a frame of LTE.

FIG. 7 shows a configuration example of a frame of LTE. In LTE, the minimum unit of the frequency scheduling and the adaptive MCS control is defined as Resource Block (RB, hereinafter referred to as RB) in the frequency direction, and Sub-frame in the time direction. In the signal configuration of one sub-frame and RB (hereinafter, this is referred to as 1 RB/Sub-frame) functioning as a resource unit, as shown in a frame in which RB15 of Sub-frame #0 in the figure is enlarged, a control signal and the reference signal RS are allocated from the head of the time axis, and then data are allocated. Here, 1 RB/Sub-frame consists of 12 sub-carriers in the frequency direction, and 14 OFDM symbols in the time direction. The reference signal RS is allocated in a specific OFDM symbol and sub-carrier in 1 RB/Sub-frame. The unit of these OFDM symbol and sub-carrier is called RE (Resource Element).

Figure 8:
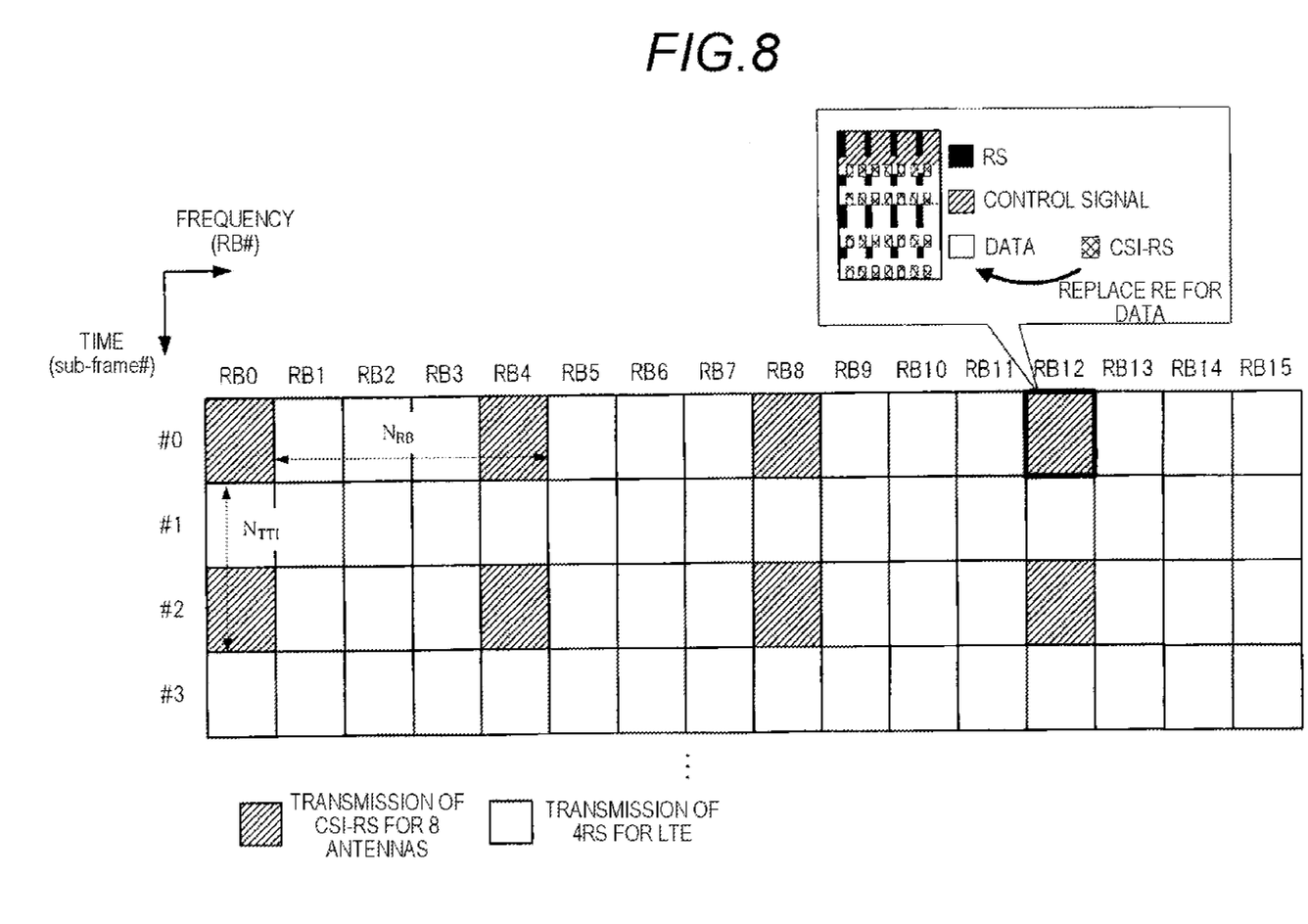
FIG. 8 is a diagram showing a conventional example of a CSI-RS transmission method corresponding to LTE-A.

FIG. 8 is a diagram showing a conventional example of the above-described CSI-RS transmission method corresponding to LTE-A. The example of FIG. 8 shows, as an example of the CSI-RS transmission method for LTE-A, a method of transmitting CSI-RS for 8 antennas by using only specific RB/Sub-frames (for example, see Non-patent Literature 2). As shown in FIG. 8, the method is configured so that CSI-RS (second reference signal) for 8 antennas is transmitted by using only the RB/Sub-frames indicated by the oblique lines, and, in the other RB/Sub-frames, only 4RS (first reference signal) corresponding to 4 antennas for LTE is transmitted. In the signal configuration of 1 RB/Sub-frame, as shown in a frame in which RB12 of Sub-frame #0 in the figure is enlarged, a control signal and the reference signal RS for LTE are allocated from the head of the time axis, and then CSI-RS for 8 antennas and data are allocated together with the reference signal RS for LTE. In this case, CSI-RS has a form in which RE for data is replaced.

The CSI-RS transmission method is configured so that an LTE user equipment that can compatible only with LTE can receive data in the latter resource in which CSI-RS is not transmitted, and 4RS for LTE is transmitted also in the former resource (RB/Sub-frames of the oblique lines) in which CSI-RS is transmitted, thereby enabling also the LTE user equipment to measure CQI. Furthermore, RB/Sub-frames for transmitting CSI-RS for 8 antennas are discretely allocated. However, it is possible to accurately measure CQI in each resource by interpolating/averaging the resources.

CITATION LIST

Non-Patent Literature

Non-patent Literature 1: 3GPP TSG RAN WG1 #56, R1-091066, CATT, CMCC, Ericsson, Huawei, LGE, Motorola, Nokia, Nokia Siemens Networks, Nortel, Panasonic, Philips, Qualcomm Europe, Samsung, Texas Instruments, "Way forward on downlink reference signals for LTE-A", Feb., 9-13, 2009

Non-patent Literature 2: 3GPP TSG RAN WG1 #55bis, R1-090317, NTT Docomo, "Support of DL Higher-Order MIMO Transmission in LTE-Advanced", Jan. 12-16, 2009

SUMMARY OF INVENTION

Technical Problem

In the above-described conventional CSI-RS transmission method, in order to attain an effect of interpolation/averaging, the intervals of RB/Sub-frames for transmitting CSI-RS must be shortened, and hence there is a problem in that the throughput is lowered. Examples of the reason of this are as follows; 1) as shown in the frames of FIG. 8, in RB/Sub-frames for transmitting CSI-RS, the data part is punctured, and therefore the demodulation performance of an LTE user equipment is deteriorated; and 2) because of the above-described reason or the like, an LTE user equipment is hardly allocated to RB/Sub-frames for transmitting CSI-RS, and hence scheduling is restricted.

The invention has been conducted in view of the above-described circumstances. It is an object of the invention to provide a radio reception apparatus, a radio transmission apparatus, and a radio communication method in which, in the case where a second reference signal for a second communication system is transmitted in addition to a first reference signal for a first communication system, resources that affect a reception apparatus compatible only with the first communication system can be minimized, and the throughput can be prevented from being deteriorated.

Solution to Problem

The present invention provides, as a first aspect, a radio reception apparatus to be used in a radio communication system where communication is performed by using a plurality of resources defined in a frequency-time domain, the radio reception apparatus including: a resource information acquiring section which is configured to acquire distribution resource information for a second reference signal when the second reference signal for a second communication system is transmitted from a radio transmission apparatus in addition to transmitting a first reference signal for a first communication system, in a case where distributed type resources in which a resource unit defined in the frequency-time domain is divided in a time direction and distributedly allocated at predetermined frequency intervals are used as resources for the second reference signal; a receiver which is configured to receive a signal containing the second reference signal transmitted from the transmission apparatus; a channel quality measuring section which is configured to measure a channel quality of a transmission channel by using the second reference signal that is allocated in the distributed type resources on the basis of the distribution resource information; and a feedback information transmitter which is configured to transmit feedback information containing channel quality information indicative of the channel quality, to the transmission apparatus.

The present invention includes, as a second aspect, the radio reception apparatus, wherein resources in which the first and second half slots into which the resource unit defined in the frequency-time domain is divided in the time direction are set, and the first and second half slots are hopped in the frequency direction and distributedly allocated at predetermined frequency intervals are used as the distributed type resources, and the channel quality measuring section is configured to measure the channel quality by means of the second reference signal which is transmitted while being allocated in a part of the distributed type resources.

The present invention includes, as a third aspect, the radio reception apparatus, wherein the first communication system is LTE (Long Term Evolution), the second communication system is LTE-A (LTE-advanced), and DVRB (Distributed Virtual Resource Block) resources which are distribution resources defined by LTE are used as the distributed type resources, wherein the DVRB resources are one in which first and second half slots that are divided from each other in the time direction are hopped in the frequency direction and distributedly allocated at predetermined frequency intervals, and the channel quality measuring section is configured to measure the channel quality by means of the second reference signal which is transmitted while being allocated in a part of the DVRB resources.

The present invention includes, as a fourth aspect, the radio reception apparatus, wherein the channel quality measuring section is configured to measure the channel quality by means of the second reference signal which is transmitted while being allocated in a resource with a specific resource ID of the DVRB resources.

The present invention includes, as a fifth aspect, the radio reception apparatus, wherein the channel quality measuring section is configured to measure the channel quality by means of the second reference signal which is transmitted while being allocated in the second half slot of the DVRB resources.

The present invention provides, as a sixth aspect, a radio transmission apparatus to be used in a radio communication system where communication is performed by using a plurality of resources defined in a frequency-time domain, the radio transmission apparatus including: a resource setting section which is configured to perform resources setting used in a case where distributed type resources in which a resource unit defined in the frequency-time domain is divided in a time direction and distributedly allocated at predetermined frequency intervals are used as resources for a second reference signal when the second reference signal for a second communication system is transmitted to a radio reception apparatus in addition to transmitting a first reference signal for a first communication system; a reference signal generator which is configured to generate and allocates the second reference signal in the distributed type resources on the basis of the resource setting for the second reference signal; a transmitter which is configured to transmit a signal containing the second reference signal to the reception apparatus; a feedback information acquiring section which is configured to receive feedback information informed from the reception apparatus, and acquire channel quality information contained in the feedback information; and a scheduler which is configured to perform scheduling containing at least one of frequency scheduling and an adaptive MCS (Modulation and Coding Scheme) control related to a transmission signal on the basis of the channel quality information.

The present invention includes, as a seventh aspect, the radio transmission apparatus, wherein resources in which the first and second half slots into which the resource unit defined in the frequency-time domain is divided in the time direction are set, and the first and second half slots are hopped in the frequency direction and distributedly allocated at predetermined frequency intervals are used as the distributed type resources, and the resource setting section is configured to perform resource setting in which the second reference signal is allocated in a part of the distributed type resources.

The present invention includes, as an eighth aspect, the radio transmission apparatus, wherein the first communication system is LTE, the second communication system is LTE-A, and DVRB resources which are distribution resources defined by LTE are used as the distributed type resources, wherein the DVRB resources are one in which first and second half slots that are divided from each other in the time direction are hopped in the frequency direction are distributedly allocated at predetermined frequency intervals, and the resource setting section is configured to perform resource setting in which the second reference signal is allocated in a part of the DVRB resources.

The present invention includes, as a ninth aspect, the radio transmission apparatus, wherein the resource setting section is configured to perform resource setting in which the second reference signal is allocated in a resource with a specific resource ID of the DVRB resources.

The present invention includes, as a tenth aspect, the radio transmission apparatus, wherein the resource setting section is configured to perform resource setting in which the second reference signal is allocated in the second half slot of the DVRB resources.

The present invention provides, as an eleventh aspect, a radio communication method in a radio reception apparatus which performs communication by using a plurality of resources defined in a frequency-time domain, the radio communication method including the steps of acquiring distribution resource information for a second reference signal when the second reference signal for a second communication system is transmitted from a radio transmission apparatus in addition to transmitting a first reference signal for a first communication system, in a case where distributed type resources in which a resource unit defined in the frequency-time domain is divided in a time direction and distributedly allocated at predetermined frequency intervals are used as resources for the second reference signal; receiving a signal containing the second reference signal transmitted from the transmission apparatus; measuring a channel quality of a transmission channel by using the second reference signal that is allocated in the distributed type resources on the basis of the distribution resource information; and transmitting feedback information containing channel quality information indicative of the channel quality, to the transmission apparatus.

The present invention provides, as a twelfth aspect, a radio communication method in a radio transmission apparatus which performs communication by using a plurality of resources defined in a frequency-time domain, the radio communication method including the steps of performing resources setting used in a case where distributed type resources in which a resource unit defined in the frequency-time domain is divided in a time direction and distributedly allocated at predetermined frequency intervals are used as resources for a second reference signal when the second reference signal for a second communication system is transmitted to a radio reception apparatus in addition to transmitting a first reference signal for a first communication system; generating and allocating the second reference signal in the distributed type resources on the basis of the resource setting for the second reference signal; transmitting a signal containing the second reference signal to the reception apparatus; receiving feedback information informed from the reception apparatus, and acquire channel quality information contained in the feedback information; and performing scheduling containing at least one of frequency scheduling and an adaptive MCS (Modulation and Coding Scheme) control related to a transmission signal on the basis of the channel quality information.

According to the configuration, when the second reference signal for the second communication system is transmitted in addition to the first reference signal for the first communication system, the second reference signal is transmitted by using distributed type resources, whereby resources that affect the reception apparatus compatible only with the first communication system can be minimized. In this case, in distributed type resources in which the first and second half slots in one unit are hopped in the frequency direction and distributedly allocated at predetermined frequency intervals, the second reference signal is transmitted while being allocated in a part of the distributed type resources, whereby the allocation of the second reference signal is limited to a part of the resources. Therefore, resources that affect the reception apparatus compatible only with the first communication system can be minimized. Consequently, the throughput can be prevented from being deteriorated.

In the case where the first communication system and the second communication system are made correspondent to LTE and LTE-A, the second reference signal is transmitted by using the DVRB resources. Here, in the case where the second reference signal is transmitted while being allocated in a resource with a specific resource ID of the DVRB resources, the resource in which the second reference signal is allocated can be limited to a designated DVRB resource. When data for an LTE user equipment are allocated to resources other than this, therefore, the data part can be prevented from being punctured by the second reference signal, and deterioration of the demodulation performance can be suppressed. In all resources, there is a DVRB resource slot in which the second reference signal does not exist, an LTE user equipment can be allocated thereto, and hence limitation on scheduling can be reduced. Therefore, deterioration of the demodulation performance and limitation on a scheduler due to a reference signal for added LTE-A can be avoided, and hence the throughput can be prevented from being lowered.

In the case of correspondence to LTE and LTE-A, and in the case where the second reference signal is transmitted while being allocated in the second half slot of the DVRB resources, the resource in which the second reference signal is allocated is limited to the second half slot of the DVRB resources. In this case, in data, a systematic bit and a parity bit are allocated from the beginning of the resource, and the second reference signal is not located in the portion of the systematic bit of the data. Even in the case where an LTE user equipment is allocated and multiplexing is performed, therefore, the possibility that the systematic bit of the data for the LTE user equipment is punctured by the second reference signal can be reduced. Therefore, the possibility that deterioration of the demodulation performance occurs in the LTE user equipment can be reduced. Moreover, an LTE user equipment can be allocated to an arbitrary resource irrespective of the allocation of the second reference signal, and hence limitation on scheduling can be reduced. Because of these, the throughput can be prevented from being deteriorated.

Advantageous Effects of Invention

According to an aspect of the invention, it is possible to provide a radio reception apparatus, a radio transmission apparatus, and a radio communication method in which, in the case where a second reference signal for a second communication system is transmitted in addition to a first reference signal for a first communication system, resources that affect a reception apparatus compatible only with the first communication system can be minimized, and the throughput can be prevented from being deteriorated.

DESCRIPTION OF EMBODIMENTS

In an embodiment, an example will be described in which a radio reception apparatus, a radio transmission apparatus, and a radio communication method according to an aspect of the invention are applied to a cellular system for mobile communication such as a mobile telephone. Here, a case where, in a radio communication system in which a base station (BS) is a transmission apparatus, and a user equipment (UE) of a mobile station is a reception apparatus, communication based on MIMO is performed will be exemplified. It is assumed that the base station communicates with a user equipment compatible with LTE which is a first communication system, and with a user equipment compatible with LTE-A which is a second communication system. Here, the relationship between the first communication system (LTE) and the second communication system (LTE-A) is assumed that the second communication system is a communication system which, as compared with the first communication system, accepts a larger number of transmission antennas in the reception side. In this case, reference signals for performing the frequency scheduling and the adaptive MCS control are transmitted from the base station to the user equipment. It is assumed that, as the reference signals, a second reference signal CSI-RS for LTE-A (for 8 antennas) is used in addition to a first reference signal 4RS for LTE (for 4 antennas).

(First Embodiment)

As described in Background Art section, in LTE, an RB/Sub-frame which is a resource unit defined by RB in the frequency direction and Sub-frame in the time direction is used as a plurality of resources which are defined in a frequency-time domain of the frequency and the time. In the frame configuration of LTE, the frequency scheduling and the adaptive MCS control are performed while taking an RB/Sub-frame as the minimum unit. In the embodiment, distributed type resources are used in which one physical RB/Sub-frame is divided in the time direction into first and second half slots, and resources in the unit of one logical RB/Sub-frame are hopped in the first and second half slots in the frequency direction to be discretely allocated at predetermined frequency intervals in two different physical RB/Sub-frames, whereby the resources are distributedly allocated. In LTE, such distributed type resources are referred to as distribution resources (DVRB: Distributed Virtual RB, hereinafter referred to as DVRB resources). In the DVRB resources, a reference signal CSI-RS for LTE-A is allocated only to some of the DVRB resources, for example, to two of four resources, and then it is transmitted. In the embodiment, namely, attention is focused on the method of allocating resources for transmitting reference signals, and DVRB resources are used as resources for distribution resources. The reference signal CSI-RS for LTE-A is allocated only in a region indicated by a part of resources of the DVRB resources, and then it is transmitted.

According to the configuration, in a specific RB/Sub-frame for transmitting CSI-RS, CSI-RS is allocated in the first half slot or the second half sot, and CSI-RS exists only in a part of resources of one physical RB/Sub-frame. A specific example of the CSI-RS transmission method in the embodiment will be described later in detail.

In the configuration which uses the above-described CSI-RS transmission method, resources that affect an LTE user equipment compatible only with LTE can be minimized, whereby the throughput can be prevented from being deteriorated. More specifically, with respect to deterioration of the demodulation performance of an LTE user equipment, the resource in which CSI-RS is allocated can be limited to a designated DVRB resource. When data for the LTE user equipment are allocated to resources other than this, therefore, the data can be prevented from being punctured by CSI-RS, and deterioration of the demodulation performance can be suppressed. With respect to limitation on scheduling, the LTE user equipment is covered by using DVRB resources. In all physical RB/Sub-frames, consequently, there is a DVRB resource slot in which CSI-RS does not exist, the LTE user equipment can be allocated thereto, and hence limitation on scheduling can be reduced. According to the embodiment, therefore, deterioration of the demodulation performance and limitation on a scheduler due to the reference signal CSI-RS for an added LTE-A can be avoided, and hence the throughput can be prevented from being lowered. According to the configuration, high-order MIMO and cooperative multipoint transmission/reception of a multi-antenna system in a cellular system can be realized with excellent characteristics.

Next, the configuration of a specific example of reception and transmission apparatuses of the radio communication system of the embodiment will be described.

Figure 1:
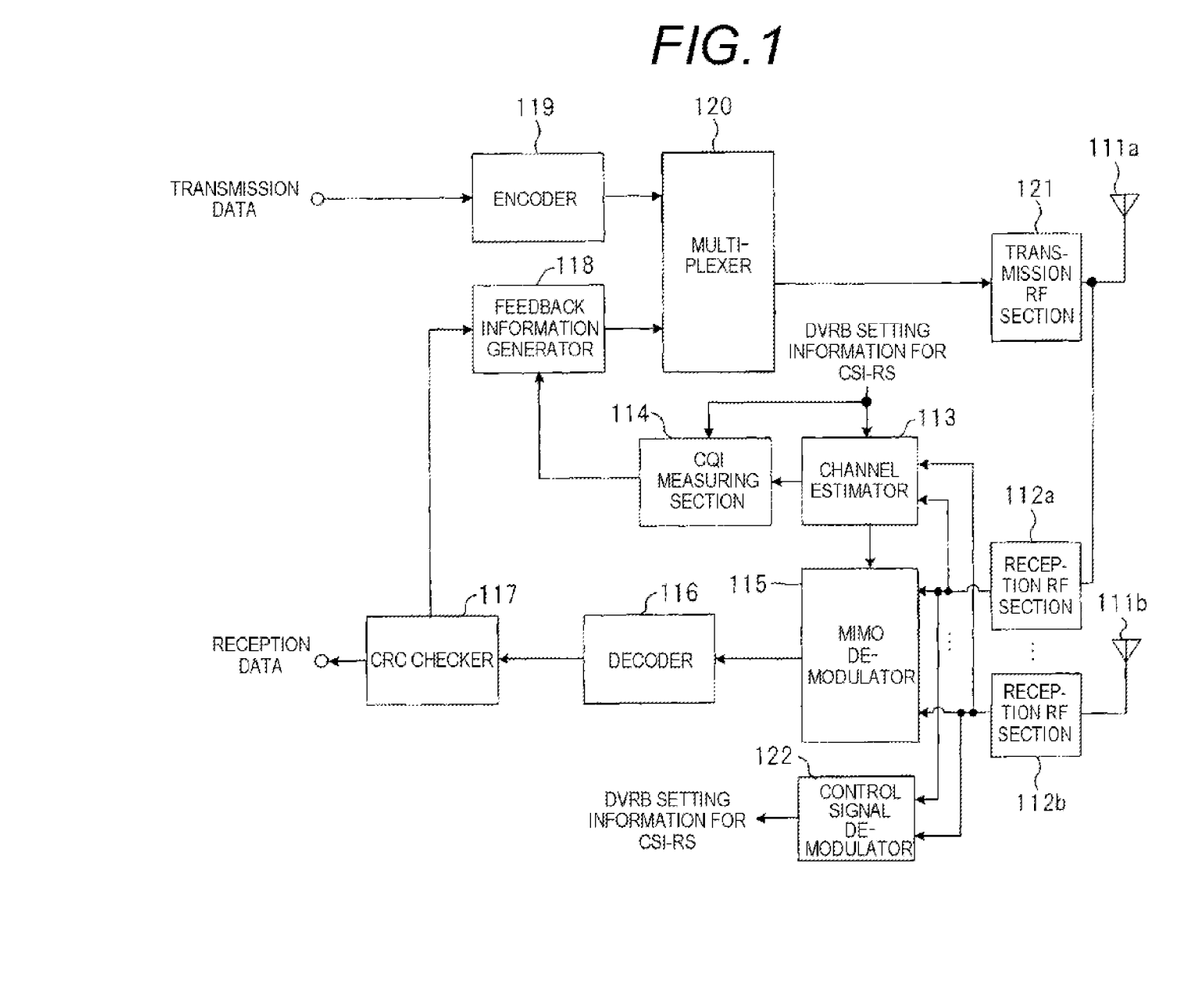
FIG. 1 is a block diagram showing the configuration of main portions of a reception apparatus which is used in an embodiment of the invention.
Figure 2:
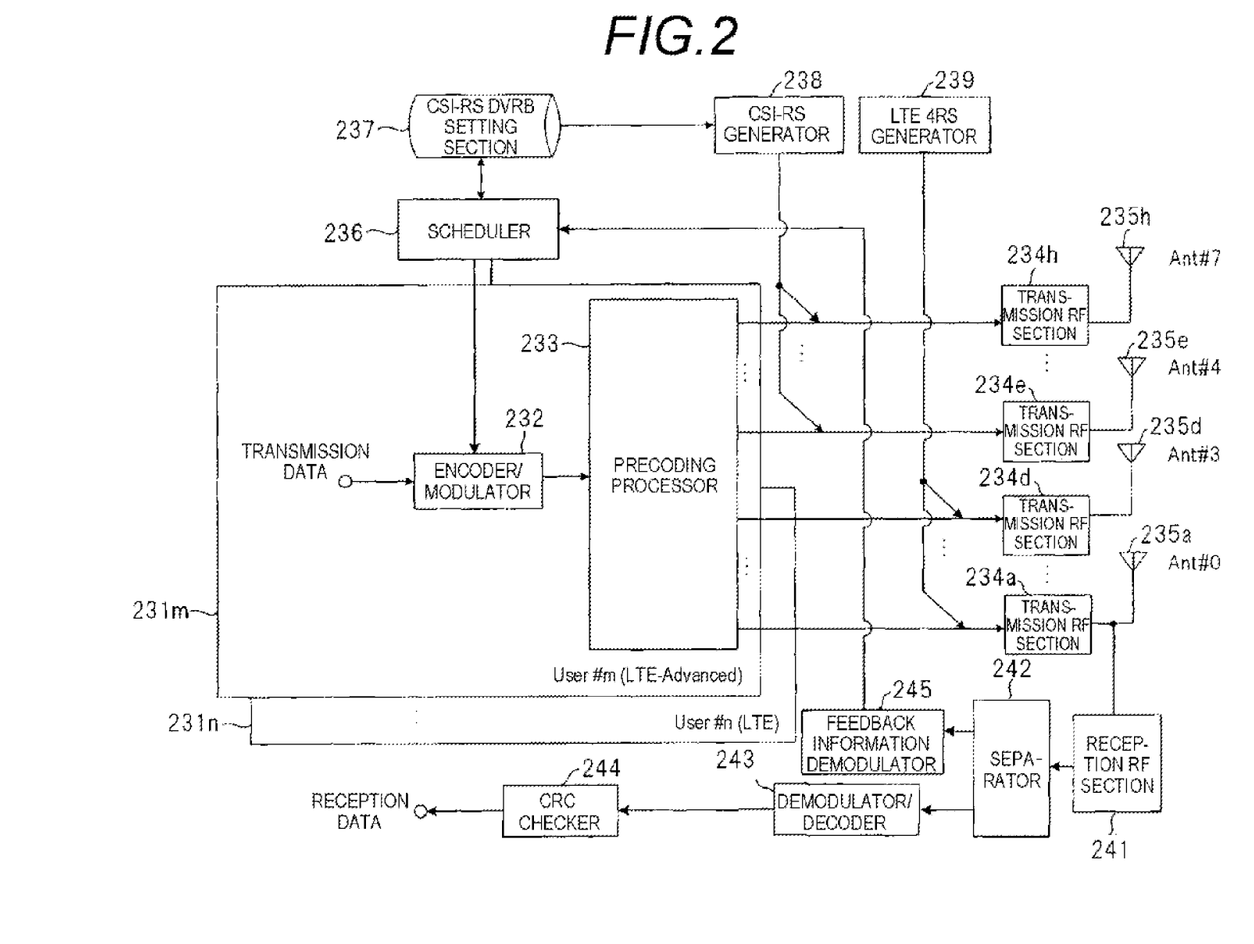
FIG. 2 is a block diagram showing the configuration of main portions of a transmission apparatus which is used in the embodiment of the invention.

FIG. 1 is a block diagram showing the configuration of main portions of the reception apparatus which is used in the embodiment of the invention, and FIG. 2 is a block diagram showing the configuration of main portions of the transmission apparatus which is used in the embodiment of the invention.

In the embodiment, a case where radio communication is performed by using a radio wave between the reception apparatus shown in FIG. 1 and the transmission apparatus shown in FIG. 2 is assumed. Here, it is supposed that the transmission apparatus shown in FIG. 2 is applied to a radio communication base station apparatus (base station, BS) in a cellular system, and the reception apparatus shown in FIG. 1 is applied to a user equipment (UE) which is a radio communication mobile station such as a portable telephone. Here, it is presumed that a MIMO system in which radio transmission/reception is performed by using a plurality of antennas in both transmission and reception is configured, the transmission apparatus can perform transmission on each of a plurality of reception apparatuses, and Precoding transmission in which the plurality of antennas are weighted in the transmission side is performed. In the mode of a communication signal, for example, it is assumed that communication is performed according to a multicarrier communication system using an OFDM (Orthogonal Frequency Division Multiplexing) signal. As a specific example, the case where the base station functioning as the transmission apparatus performs communication with an LTE user equipment compatible with LTE and LTE-A user equipment compatible with LTE-A which function as the reception apparatuses will be exemplified.

The reception apparatus shown in FIG. 1 includes a plurality of antennas 111a, 111b, a plurality of reception RF sections 112a, 112b, a channel estimator 113, a CQI measuring section 114, a MIMO demodulator 115, a decoder 116, a CRC checker 117, a feedback information generator 118, an encoder 119, a multiplexer 120, a transmission RF section 121, and a control signal demodulator 122.

A radio wave transmitted from a counter apparatus (for example, the transmission apparatus shown in FIG. 2) is received by the plurality of independent antennas 111a, 111b. The high-frequency signal of the radio wave received at the antenna 111a is converted in the reception RF section 112a into a signal of a relatively low frequency band such as a baseband signal, and then subjected to processes of Fourier transform, parallel/serial conversion, and the like to lie converted into a reception signal of serial data. Similarly, the high-frequency signal of the radio wave received at the antenna 111b is converted in the reception RF section 112b into a signal of a relatively low frequency band such as a baseband signal, and then subjected to processes of Fourier transform, parallel/serial conversion, and the like to be converted into a reception signal of serial data. The outputs of the reception RF sections 112a, 112b enters the channel estimator 113, the MIMO demodulator 115, and the control signal demodulator 122.

The channel estimator 113 executes channel estimation based on reference signals contained in the signals transmitted from the transmission antennas of the counter apparatus (transmission apparatus), and calculates a channel estimation value. In this case, based on control information which is separately informed from the transmission apparatus, the reception apparatus identifies the positions of the reference signals for measuring the channel quality. Specifically, the channel estimator 113 receives DVRB setting information for CSI-RS as distribution resource information for the second reference signal, and acquires the ID and transmission subframe of a DVRB resource to which CSI-RS that is the reference signal for measuring the channel quality is allocated. Then, a channel estimating process is performed while assuming that reference signals are allocated in predetermined OFDM symbols and sub-carriers of the corresponding resource. The DVRB setting information for CSI-RS is informed with control information from the base station (counter transmission apparatus) or the like. The control signal demodulator 122 demodulates a control signal transmitted from the base station or the like, and extracts and acquires control information such as transmission parameters containing the DVRB setting information for CSI-RS related to setting of the DVRB resource, and information of MCS such as the modulation method and encoding ratio of the transmission signal. In this case, the control signal demodulator 122 previously receives and demodulates the DVRB setting information for CSI-RS, and holds it. The channel estimation value calculated by the channel estimator 113 is input to the CQI measuring section 114 and the MIMO demodulator 115.

The CQI measuring section 114 calculates CQI as the channel quality (reception quality) by using the channel estimation value which is output by the channel estimator 113, and outputs CQI to the feedback information generator 118. In this case, similarly with the channel estimator 113, the CQI measuring section 114 receives the DVRB setting information for CSI-RS, and acquires the ID and transmission subframe of a DVRB resource to which CSI-RS that is the reference signal for measuring the channel quality is allocated. The frequency/time intervals at which the resources are allocated are identified, processes of averaging and interpolation are performed on the obtained channel estimation value, and then channel quality information is calculated. Specific examples of the channel quality information are CQI corresponding to a predetermined combination of the modulation method and the encoding ratio, PMI for selecting a precoding matrix which meets the current channel state from a predetermined codebook, and RI corresponding to the desired number of transmission streams.

The MIMO demodulator 115 demodulates the reception signal corresponding to the own apparatus (own reception apparatus) by using the channel estimation value received from the channel estimator 113, and outputs the demodulated signal to the decoder 116. In this case, a deinterleave process, a rate-dematching process, a likelihood combining process, and the like are performed. The decoder 116 decodes the signal entered from the MIMO demodulator 115 to restore the received data. In this case, an error correction decoding process is applied to the signal which is received from the MIMO demodulator 115, and which has been undergone the MIMO separation, and then the signal is output to the CRC checker 117. The CRC checker 117 performs an error detecting process due to CRC (Cyclic Redundancy Check) check on the decoded signal which is output from the decoder 116, and outputs data error existence information indicating whether the decoded reception data contain an error or not, to the feedback information generator 118. Then, the reception data are output from the CRC checker 117.

The feedback information generator 118 generates feedback information containing the channel quality information (CQI, PMI, RI, and the like) calculated by the CQI measuring section 114. Furthermore, the feedback information generator 118 determines whether the decoded reception data contain an error or not, based on the result of the error detection in the CRC checker 117, and generates Ack/Nack information. If the decoding result does not contain an error, Ack (Acknowledgement) is generated, and, if the decoding result contains an error, Nack (Negative Acknowledgement) is generated.

The encoder 119 encodes the transmission data, and then outputs the data to the multiplexer 120. The multiplexer 120 multiplexes the entered feedback information, the transmission signal containing the encoded transmission data, etc. Then, the multiplexer 120 performs a Rate-Matching process of adaptively setting the number of modulation multiple values and the coding ratio, an interleave process, a modulating process, and the like, and outputs a result to the transmission RF section 121. The transmission RF section 121 performs processes of serial/parallel conversion, inverse Fourier transform, and the like, then conversion into a high-frequency signal of a predetermined radio frequency band, power amplification, and then transmission as a radio wave from the antenna 111a. At this time, the feedback information such as the channel quality information and the Ack/Nack information transmitted from the reception apparatus is transmitted to the transmission apparatus as a feedback signal to be informed.

In the above-described configuration, the control signal demodulator 122 implements the function of a resource information acquiring section. Moreover, the reception RF sections 112a, 112b and the MIMO demodulator 115 implement the function of a receiver. Furthermore, the channel estimator 113 and the CQI measuring section 114 implement the function of a channel quality measuring section. Furthermore, the feedback information generator 118, the multiplexer 120, and the transmission RF section 121 implement the function of a feedback information transmitter.

On the other hand, the transmission apparatus shown in FIG. 2 includes a plurality of user equipment signal processors 231m, 231n, a encoder/modulator 232, a precoding processor 233, a plurality of transmission RF sections 234a to 234d, and 234e to 234h, a plurality of antennas 235a to 235d, and 235e to 235h, a scheduler 236, a CSI-RS DVRB setting section 237, a CSI-RS generator 238, an LTE 4RS generator 239, a reception RF section 241, a separator 242, a demodulator/decoder 243, a CRC checker 244, and a feedback information demodulator 245.

A radio wave transmitted from a counter apparatus (for example, the reception apparatus shown in FIG. 1) is received by the antenna 235a. The high-frequency signal of the radio wave received at the antenna 235a is converted into a signal of a relatively low frequency band such as a baseband signal in the reception RF section 241, and then input to the separator 242. The separator 242 separates the feedback signal from the reception signal, and outputs the feedback signal to the feedback information demodulator 245, and the other reception signal to the demodulator/decoder 243. The channel quality information, Ack/Nack information, and the like contained in the feedback signal are demodulated in the feedback information demodulator 245, and input to the scheduler 236. Based on the channel quality information informed from the reception apparatus, the scheduler 236 executes at least one of the frequency scheduling and the adaptive MCS control, as scheduling related to the transmission signal.

The demodulator/decoder 243 performs a demodulating process and a decoding process on the reception signal separated in the separator 242 to restore the received data. The CRC checker 244 executes an error detecting process based on CRC checking on the decoded signal output from the demodulator/decoder 243, and determines whether the decoded reception data contain an error or not. Then, the reception data are output from the CRC checker 244.

The user equipment signal processors 231*m*, 231*n* perform a signal process on transmission signals corresponding to respective user equipments for LTE-A, LTE, and the like, and each of them has the encoder/modulator 232 and the precoding processor 233. The encoder/modulator 232 encodes the transmission data, multiplexes the control signal and the like, performs a Rate-Matching process, an interleave process, a modulating process, and the like, and outputs a result to the precoding processor 233. The precoding processor 233 performs a weighting process for forming a beam of a transmission wave on respective transmission signals which are to be output to the plurality of antennas, and outputs the transmission signals to the transmission RF sections 234*a* to 234*d*, and 234*e* to 234*h* of the antennas.

In the transmission RF sections 234*a* to 234*d*, and 234*e* to 234*h*, the transmission signals are subjected to processes of serial/parallel conversion, inverse Fourier transform, and the like, then converted into high-frequency signals of a predetermined radio frequency band, power amplified, and thereafter transmitted as radio waves from the antennas 235*a* to 235*d*, and 235*e* to 235*h*. In a transmitter for LTE-A in the illustrated example, transmission signals which are to be transmitted by using the 8 antennas are generated. The transmission signals from the transmission apparatus are transmitted to the reception apparatus as, for example, a pilot channel, the control signal, a data signal containing various data, etc. Here, the pilot channel and the control signal are transmitted as nondirectional signals which do not form a beam, and the data signal is transmitted as a directional signal in which a predetermined beam corresponding to a beam number is formed by precoding in a predetermined transmission channel.

The CSI-RS DVRB setting section 237 separately informs the user equipments of DVRB setting information for CSI-RS, and notifies DVRB setting information for CSI-RS to the CSI-RS generator 238 and the scheduler 236. The CSI-RS generator 238 generates a reference signal CSI-RS for LTE-A (for 8 antennas), and allocates the CSI-RS in the corresponding transmission sub-frame, and resources corresponding to the ID of DVRB resources. The LTE 4RS generator 239 generates a reference signal 4RS for LTE (for 4 antennas), and allocates it in resources. In the configuration example of FIG. 2, it is supposed that transmission is performed while, with the intention of application to high-order MIMO, CSI-RS is allocated in Ant #4 to Ant #7 (the antennas 235*e* to 235*h*), and, in Ant #0 to Ant #3 (the antennas 235*a* to 235*d*), only the reference signal 4RS for LTE is allocated. The scheduler 236 performs allocation of the user equipments by using the received DVRB setting information for CSI-RS. In this case, based on the transmission sub-frame corresponding to CSI-RS and the IDs of DVRB resources, allocation of LTE user equipments is performed by using resources to which CSI-RS is not allocated. Here, the description has been made with reference to the figure in which application to high-order MIMO is intended. However, transmission of CSI-RS is not limited to this. In the case where antenna reference signals which are larger in number than those for LTE are received in the reception side, for example, an operation of receiving reference signals transmitted from a plurality of base stations may be possible. Here, the example in which LTE is set to 4 antennas and high-order MIMO is set to additional 4 antennas has been described. The configuration is not limited to this. For example, LTE may be set to 2 antennas and high-order MIMO may be set to additional two antennas, a combination of the both may be employed, or a total of 8 antennas in which LTE is set to 2 antennas and high-order MIMO is set to additional 6 antennas may be employed. Here, the example in which CSI-RS is not allocated in the antennas where the reference signal for LTE is allocated has been described. The configuration is not limited to this. For example, CSI-RS may be allocated in all of the antennas Ant #0 to Ant #7.

In the above-described configuration, the CSI-RS DVRB setting section 237 implements the function of a resource setting section. The CSI-RS generator 238 implements the function of a reference signal generator. The user equipment signal processors 231*m*, 231*n* and the transmission RF sections 234*a* to 234*d*, and 234*e* to 234*h* implement the function of a transmitter. The reception RF section 241, the separator 242, and the feedback information demodulator 245 implement the function of a feedback information acquiring section.

Figure 3:
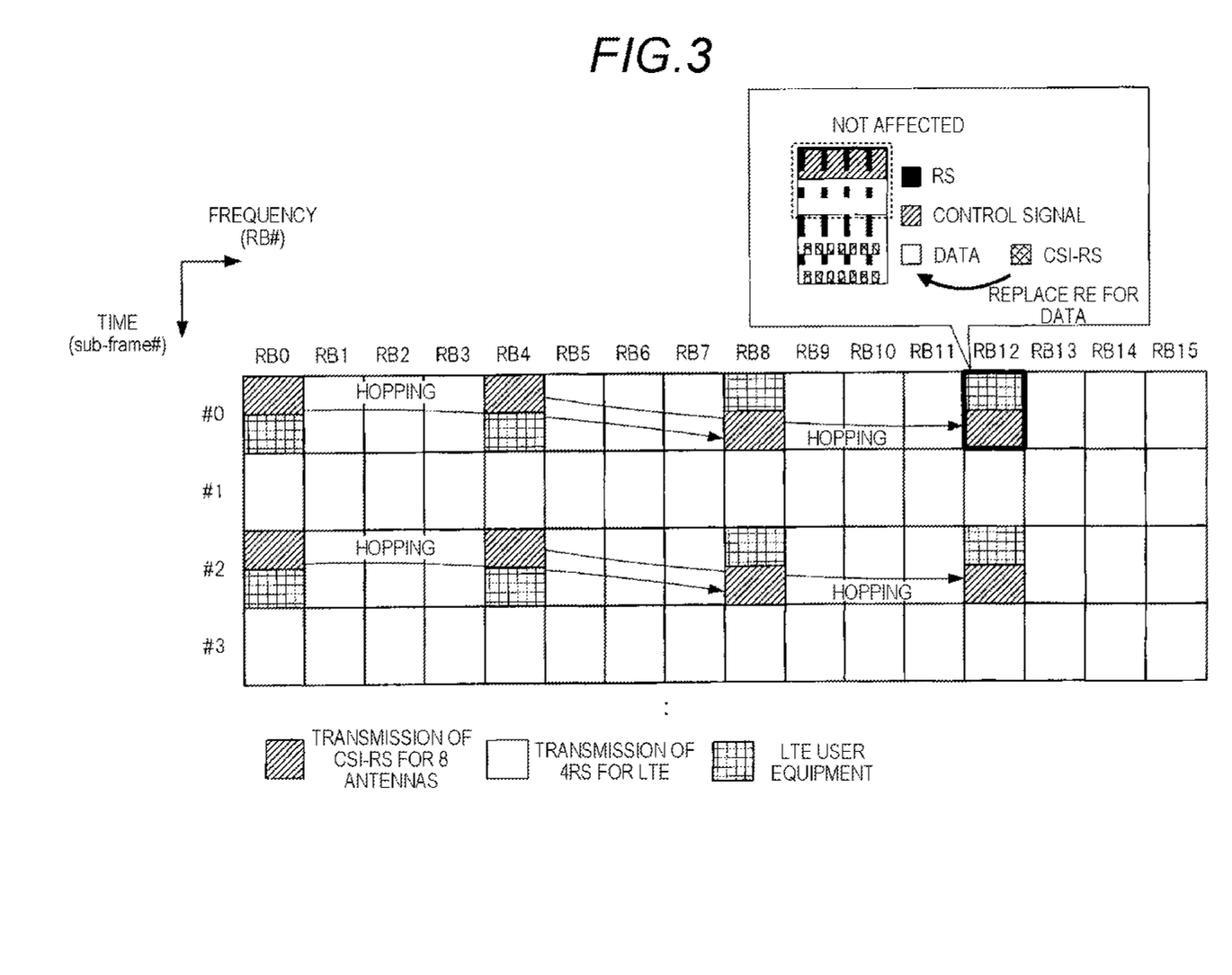
FIG. 3 is a diagram showing the CSI-RS transmission method in a first embodiment.

Next, the method of transmitting CSI-RS which is the reference signal for measuring the channel quality will be described in detail. FIG. 3 is a diagram showing the CSI-RS transmission method in the first embodiment, and shows an allocation example of reference signals, control signals, data, and the like on resources. In the first embodiment, it is assumed that, among DVRB resources of Sub-frame #0, resources corresponding to the first half slot of RB0 and the second half slot of RB8 (blocks indicated by oblique hatching in the figure) are used in transmission of the corresponding reference signal CSI-RS. An example in which, among DVRB resources of the corresponding sub-frame, an LTE user equipment is allocated to the second half slot of RB0 and the first slot of RB8 (blocks indicated by lattice hatching in the figure) is shown. First and second slots which are hopped to be allocated to different RB/Sub-frames are defined by one resource ID.

The CSI-RS DVRB setting section 237 sets DVRB resources so that CSI-RS is allocated in one slot (blocks indicated by oblique hatching in FIG. 3) of one RB/Sub-frame among resources which are distributedly allocated at predetermined frequency intervals. In accordance with the above-described setting of DVRB resources, the CSI-RS generator 238 generates and allocates CSI-RS in the corresponding resource. Based on the above-described setting of DVRB resources, the scheduler 236 allocates an LTE user equipment to RB/Sub-frames to which CSI-RS is not allocated, or to the other slots (blocks indicated by lattice hatching in FIG. 3) of RB/Sub-frames to which CSI-RS is allocated.

At this time, as shown in a frame in which RB12 of Sub-frame #0 is enlarged in FIG. 3, RE (symbol sub-carrier) for transmitting CSI-RS is located in a second half in the allocation resource of one RB/Sub-frame, and RE of a data part of the second half is replaced with CSI-RS. Therefore, the allocation of CSI-RS is limited to one slots (blocks indicated by oblique hatching), and data for a user equipment which are multiplexed on the other slots (blocks indicated by lattice hatching) can be transmitted without being affected by transmission of CSI-RS. It is assumed that a resource in the unit of 1 RB/Sub-frame which is indicated as RB in the figure has, for example, 12 sub-carriers in the frequency direction and 14 symbols in the time direction, or a total of 168 sets of RE.

Moreover, CSI-RS is enabled to be distributedly allocated by using DVRB resources, and, as shown in the figure, CSI-RS can be allocated in positions which are largely separated from each other in the frequency direction by single resource ID notification. The DVRB setting information for CSI-RS instructing the DVRB resources may be informed as notification information indicating control information of the whole cell, or may be informed as Radio resource control (RRC) information for individual user equipment.

Figure 4:
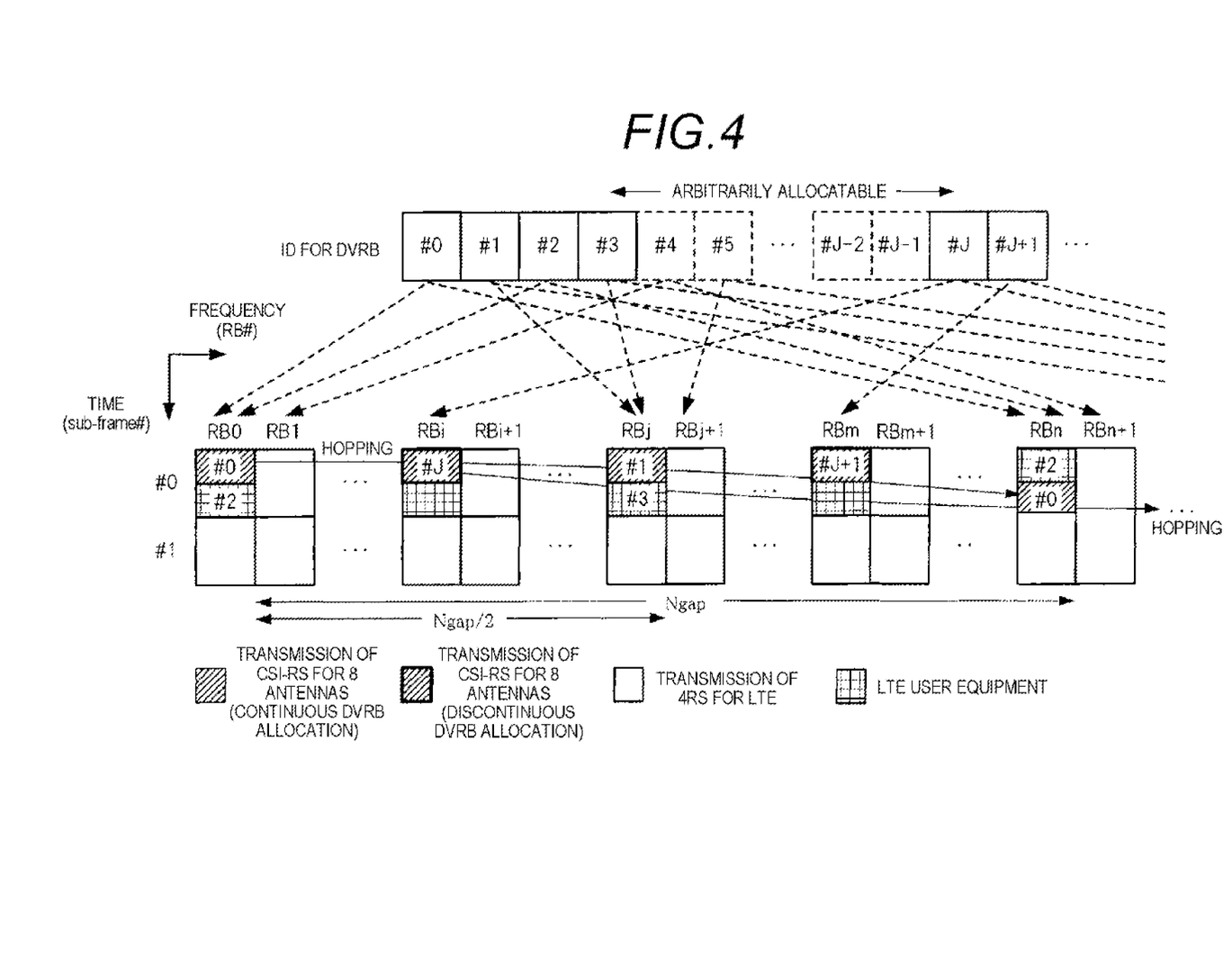
FIG. 4 is a diagram showing an example of allocation of DVRB resources in the embodiment.

Furthermore, the DVRB resource notification method will be described in detail with reference to FIG. 4. FIG. 4 is a diagram showing an example of allocation of DVRB resources in the embodiment. It is assumed that, among DVRB IDs allocated to DVRB resources, for example, CSI-RS is transmitted by using resources corresponding to DVRB #0 and DVRB #1, and, in DVRB #2 and DVRB #3, CSI-RS is not transmitted. In this case, with respect to the interval in the frequency direction, the first half slot and the second half slot of DVRB #0 are located in positions separated from each other by N-gap, and the same slots of DVRB #0 and DVRB #1 are located in positions separated from each other by N-gap/2. In LTE, the values of N-gap and N-gap/2 are fixed in accordance with the system band. In a system of 20 MHz, for example, a wide interval such as that N-gap/2 is about 5 MHz may be possible. In order to attain an effect of interpolation/averaging, preferably, CSI-RS is dispersedly allocated at adequate intervals so that the intervals are not excessively enlarged.

In the case where a resource in the frequency position which is separated from DVRB #0 by 1 MHz is used in transmission of CSI-RS, for example, corresponding DVRB #J can be used. Namely, continuous DVRB allocation such as DVRB #0 and DVRB #1, and discontinuous DVRB allocation such as DVRB #J and DVRB #J+1 can be used. In FIG. 4, in resources RB# of 1 sub-frame, RBi to which DVRB #J is allocated has a relationship of J/4=i. In this case, DVRB #2 and DVRB #3 are limited to transmission of DVRB, but frequency resources corresponding to DVRB #4 to DVRB #J−1 can be arbitrarily allocated. For example, a user equipment can be allocated as LVRB (Localized Virtual RB) which is a continuous allocation resource where resources are concentrically allocated. Therefore, an LTE user equipment can be allocated by using DVRB resources (DVRB #2 and DVRB #3 in FIG. 4) to which CSI-RS is not allocated, or LVRB.

The intervals in the case of continuous DVRB allocation may be a value of a power of 2 in the case of N-gap/($2^{n*2}$). In the case of discontinuous DVRB allocation, also the use of which one of four or DVRB #J, DVRB #J+1, DVRB #J+2, and DVRB #J+3 can be flexibly set.

In the embodiment, in the reception apparatus, by using the reference signal CSI-RS which is allocated in DVRB resources that are previously informed by DVRB setting information for CSI-RS, the channel quality is measured, and reported to the transmission apparatus. In the transmission apparatus, DVRB resources which are used in transmission of CSI-RS are previously informed to the reception apparatus, the reference signal CSI-RS is transmitted by using the corresponding DVRB resources, and a result of the measurement of the channel quality is received from the reception apparatus. By using the result of the measurement of the channel quality which is reported from the reception apparatus, the frequency scheduling and the adaptive MCS control are performed.

Here, each DVRB resource is divided into first and second half slots, and hopped in the frequency direction to be discretely allocated in different RB/Sub-frames, and the reference signal CSI-RS for LTE-A is allocated only to DVRB resources of a part of IDs. In this case, in a specific RB/Sub-frame for transmitting CSI-RS, CSI-RS is allocated in the first half slot or the second half sot, and CSI-RS exists only in a part of resources of one physical RB/Sub-frame. According to the configuration, resources that affect an LTE user equipment can be minimized, and deterioration of the demodulation performance in an LTE user equipment can be suppressed. Therefore, the throughput can be prevented from being deteriorated. Moreover, an LTE user equipment is covered by using DVRB resources, whereby limitation on scheduling can be reduced, and the throughput can be prevented from being deteriorated.

(Second Embodiment)

In a second embodiment, in the case where CSI-RS is allocated in DVRB resources which are divided into first and second half slots, and in which the slots are frequency-hopped, transmission is performed while CSI-RS is allocated in the second half slot among the first and second half slots. Here, only points which are different from the first embodiment will be described. The configurations of the reception apparatus and the transmission apparatus are identical with those of the first embodiment shown in FIGS. 1 and 2, and their description is omitted. In the second embodiment, the operations of the CSI-RS DVRB setting section 237, the CSI-RS generator 238, and the scheduler 236 in the transmission apparatus, and the contents of DVRB setting information for CSI-RS which is informed from the transmission apparatus to the reception apparatus are different.

Figure 5:
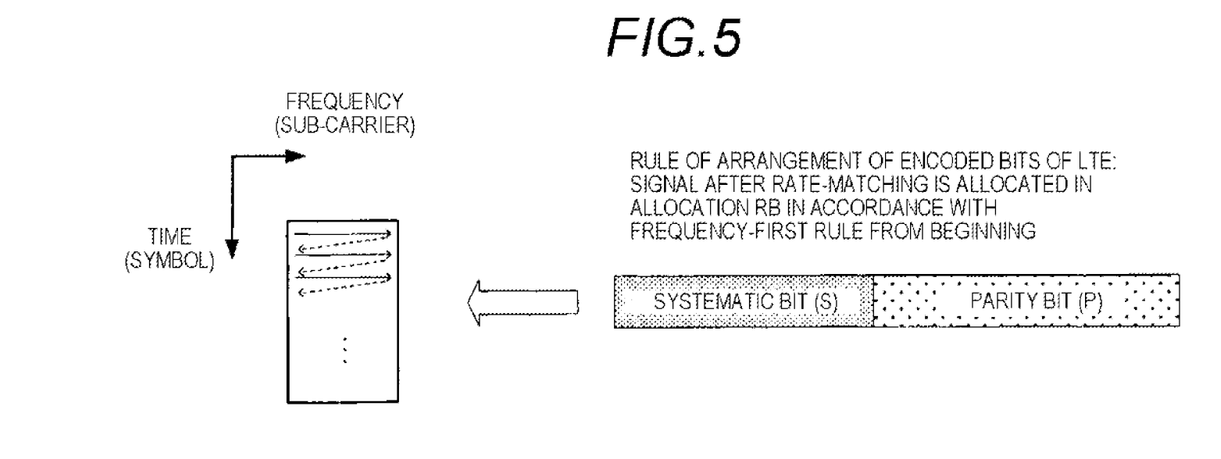
FIG. 5 is a diagram illustrating the rule of allocation of encoded bits of LTE.

FIG. 5 is a diagram illustrating the rule of allocation of encoded bits of LTE. Each encoded bit has a systematic bit (S) which is the data body before encoding, and a parity bit (P) which is redundant data added by encoding. In LTE, a signal after rate-matching is allocated in the allocation resource in accordance with the frequency-first rule from the beginning of the resource. In the allocation resource of one RB/Sub-frame, namely, allocation starting from the systematic bit is performed in sub-carriers from the top OFDM symbol in the frequency direction, and thereafter returned to the top sub-carrier of the next OFDM symbol, and allocation in the frequency direction is applied. This is repeated until the final symbol. In the transmission data, therefore, the systematic bit is allocated in the head side in the tune axis in the allocation resource, and the parity bit is allocated in the rear side. Therefore, the second half symbol in the corresponding resource has a higher possibility that the parity bit is allocated. When CSI-RS is allocated in a second half slot of a DVRB resource, therefore, there is little case where CSI-RS is allocated in the part of the systematic bit even in the case where an LTE user equipment is allowed to be allocated to a resource in which CSI-RS is allocated.

Figure 6:
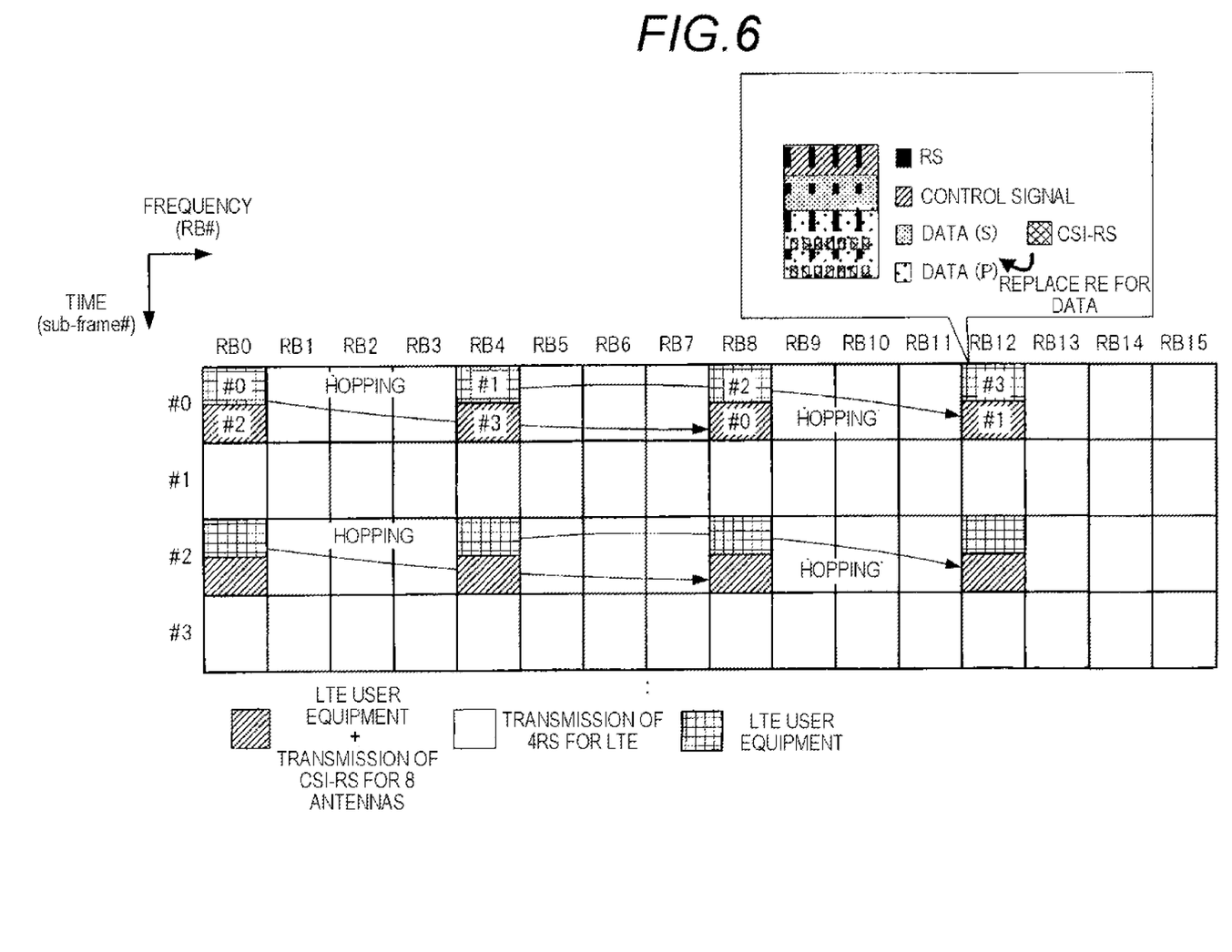
FIG. 6 is a diagram showing the CSI-RS transmission method in a second embodiment.

FIG. 6 is a diagram showing the CSI-RS transmission method in the second embodiment, and shows an allocation example of reference signals, control signals, data, and the like on resources. In the second embodiment, the reference signal CSI-RS is allocated and transmitted while, among DVRB resources of a sub-frame of Sub-frame #0, resources corresponding to the second half slots of RB0, RB4, RB8, and RB12 (blocks indicated by oblique hatching in the figure, second half slots of DVRB #0, #2, #1, #3) are used. Then, data for a user equipment are allocated to the resources including corresponding RB/Sub-frame resources which transmit CSI-RS.

The CSI-RS DVRB setting section 237 sets DVRB resources so that CSI-RS is allocated in the second half slot (blocks indicated by oblique hatching in FIG. 6) of one RB/Sub-frame among resources which are distributedly allocated at predetermined frequency intervals. In accordance with the above-described setting of DVRB resources, the CSI-RS generator 238 generates and allocates CSI-RS in the corresponding resource. Based on the above-described setting of DVRB resources, the scheduler 236 allocates user equipments including an LTE user equipment to resources including RE/Sub-frames to which CSI-RS is transmitted.

At this time, as shown in a frame in which RB12 of Sub-frame #0 is enlarged in FIG. 6, RE (symbol sub-carrier) for transmitting CSI-RS is located in a second half in the allocation resource of one RB/Sub-frame, and RE in a position corresponding to the parity bit in data for a user equipment is replaced with CSI-RS. Therefore, puncture of the data part by CSI-RS can be prevented from affecting the systematic bit. As compared with the case where the systematic bit is replaced with CSI-RS, therefore, a demodulation error in demodulation of the corresponding data can be caused to hardly occur. In the embodiment, notification of resource IDs corresponding to a plurality of DVRB resources for instructing blocks indicated by oblique hatching in FIG. 6 can allocate CSI-RS in positions which are at wide intervals in the frequency direction.

In the embodiment, in the reception apparatus, by using the reference signal CSI-RS which is allocated in second half slots in a plurality of DVRB resources that are previously informed by DVRB setting information for CSI-RS, the channel quality is measured, and reported to the transmission apparatus. In the transmission apparatus, a plurality of DVRB resources which are used in transmission of CSI-RS are previously informed to the reception apparatus, the reference signal CSI-RS is transmitted by using the second half slots of the corresponding DVRB resources, and a result of the measurement of the channel quality is received from the reception apparatus. By using the result of the measurement of the channel quality which is reported from the reception apparatus, the frequency scheduling and the adaptive MCS control are performed. In resources including the corresponding DVRB resources which transmit CSI-RS, other data for a user equipment are allocated and multiplexed.

Here, CSI-RS is allocated only in the second half slot of one RB/Sub-frame, and CSI-RS is not located in the portion of the systematic bit of data for a user equipment allocated from the beginning of the resource. Even in the case where an LTE user equipment is allocated to a resource of a RB/Sub-frame which transmits CSI-RS and multiplexing is performed, therefore, the possibility that the systematic bit of the data for the LTE user equipment is punctured can be reduced. Therefore, the possibility that deterioration of the demodulation performance occurs in the LTE user equipment can be reduced. Moreover, an LTE user equipment can be allocated to a resource of an arbitrary RB/Sub-frame irrespective of the allocation of CSI-RS, and hence limitation on scheduling can be reduced. Because of these, the throughput can be prevented from being deteriorated.

In the invention, it is expected that those skilled in the art will change or apply the matters based on the description in the description and the well-known technique without departing the spirit and scope of the invention, and such a change or application is included in the range to be protected. Furthermore, components of the embodiments may be arbitrarily combined with one another without departing the spirit of the invention.

In the description of the embodiments, antennas are adopted, but the embodiments can also be applied to an antenna port. The antenna port refers to a logical antenna configured by one or a plurality of physical antennas. That is, the antenna port does not necessarily refer to one physical antenna, and may refer to an array antenna configured by of a plurality of antennas, or the like. In LTE, for example, the number of physical antennas constituting an antenna port is not particularly defined, and is defined as the minimum unit in which a base station can transmit different Reference signals. The antenna port may be defined as the minimum unit for multiplying weighting of Precoding vector.

Although, in the embodiments, the case where the invention is configured by hardware has been exemplarily described, the invention can be realized by software.

Typically, the functional blocks which are used in the descriptions of the embodiments are realized in the form of an LSI which is an integrated circuit. They may be individually integrated in one chip, or part or all of them may be integrated in one chip. Although such an integrated circuit is referred to as an LSI, such an integrated circuit may be called an IC, a system LSI, a super LSI, or an ultra LSI depending on the degree of integration.

The method of realizing such an integrated circuit is not limited to an LSI, and the integrated circuit may be realized by a dedicated circuit or a general-purpose processor. Alternatively, it is also possible to use an FPGA (Field Programmable Gate Array) which can be programmed after the production of the LSI, or a reconfigurable processor in which the connections or settings of circuit cells in the LSI can be reconfigured.

Furthermore, with the advancement of semiconductor technologies or other technologies derived therefrom, when integrated circuit technologies which replace LSIs emerge, it is a matter of course that the functional blocks may be integrated using such technologies. The applications of biotechnologies, and the like are possible.

This application is based on Japanese. Patent Application (No. 2009-063119) filed on Mar. 16, 2009, and its content is incorporated herein by reference.

Industrial Applicability

The invention has an effect that, in the case where a second reference signal for a second communication system is transmitted in addition to a first reference signal for a first communication system, resources that affect a reception apparatus compatible only with the first communication system can be minimized, and the throughput can be prevented from being deteriorated, and is useful as a radio reception apparatus, a radio transmission apparatus, and a radio communication method which are applicable to a radio communication system such as a cellular system.

Reference Signs List

111*a*, 111*b*: antenna
112*a*, 112*b*: reception RF section
113: channel estimator
114: CQI measuring section
115: MIMO demodulator
116: decoder
117: CRC checker
118: feedback information generator
119: encoder
120: multiplexer
121: transmission RF section
122: control signal demodulator
231*m*, 231*n*: user equipment signal processor
232: encoder/modulator
233: precoding processor
234*a* to 234*d*, 234*e* to 234*h*: transmission RF section
235*a* to 235*d*, 235*e* to 235*h*: antenna
236: scheduler
237: CSI-RS DVRB setting section
238: CSI-RS generator
239: LTE 4RS generator
241: reception RF section 242: separator
243: demodulator/decoder
244: CRC checker

The invention claimed is:

1. A radio reception apparatus to be used in a radio communication system where communication is performed by using a plurality of resources defined in a frequency-time domain, the radio reception apparatus comprising:
a resource information acquiring section which is configured to acquire distribution resource information for a second reference signal when the second reference signal for a second communication system is transmitted from a radio transmission apparatus in addition to transmitting a first reference signal for a first communication system, in a case where distributed type resources in which a resource unit defined in the frequency-time domain is divided in a time direction and distributedly allocated at predetermined frequency intervals are used as resources for the second reference signal;
a receiver which is configured to receive a signal containing the second reference signal transmitted from the transmission apparatus;
a channel quality measuring section which is configured to measure a channel quality of a transmission channel by using the second reference signal that is allocated in the distributed type resources on the basis of the distribution resource information; and
a feedback information transmitter which is configured to transmit feedback information containing channel quality information indicative of the channel quality, to the transmission apparatus.

2. The radio reception apparatus according to claim 1, wherein
resources in which the first and second half slots into which the resource unit defined in the frequency-time domain is divided in the time direction are set, and the first and second half slots are hopped in the frequency direction and distributedly allocated at predetermined frequency intervals are used as the distributed type resources, and
the channel quality measuring section is configured to measure the channel quality by means of the second reference signal which is transmitted while being allocated in a part of the distributed type resources.

3. The radio reception apparatus according to claim 1, wherein
the first communication system is LTE (Long Term Evolution), the second communication system is LTE-A (LTE-advanced), and DVRB (Distributed Virtual Resource Block) resources which are distribution resources defined by LTE are used as the distributed type resources, wherein the DVRB resources are one in which first and second half slots that are divided from each other in the time direction are hopped in the frequency direction and distributedly allocated at predetermined frequency intervals, and
the channel quality measuring section is configured to measure the channel quality by means of the second reference signal which is transmitted while being allocated in a part of the DVRB resources.

4. The radio reception apparatus according to claim 3, wherein
the channel quality measuring section is configured to measure the channel quality by means of the second reference signal which is transmitted while being allocated in a resource with a specific resource ID of the DVRB resources.

5. The radio reception apparatus according to claim 3, wherein
the channel quality measuring section is configured to measure the channel quality by means of the second reference signal which is transmitted while being allocated in the second half slot of the DVRB resources.

6. A radio transmission apparatus to be used in a radio communication system where communication is performed by using a plurality of resources defined in a frequency-time domain, the radio transmission apparatus comprising:
a resource setting section which is configured to perform resources setting used in a case where distributed type resources in which a resource unit defined in the frequency-time domain is divided in a time direction and distributedly allocated at predetermined frequency intervals are used as resources for a second reference signal when the second reference signal for a second communication system is transmitted to a radio reception apparatus in addition to transmitting a first reference signal for a first communication system;
a reference signal generator which is configured to generate and allocates the second reference signal in the distributed type resources on the basis of the resource setting for the second reference signal;
a transmitter which is configured to transmit a signal containing the second reference signal to the reception apparatus;
a feedback information acquiring section which is configured to receive feedback information informed from the reception apparatus, and acquire channel quality information contained in the feedback information; and
a scheduler which is configured to perform scheduling containing at least one of frequency scheduling and an adaptive MCS (Modulation and Coding Scheme) control related to a transmission signal on the basis of the channel quality information.

7. The radio transmission apparatus according to claim 6, wherein
resources in which the first and second half slots into which the resource unit defined in the frequency-time domain is divided in the time direction are set, and the first and second half slots are hopped in the frequency direction and distributedly allocated at predetermined frequency intervals are used as the distributed type resources, and
the resource setting section is configured to perform resource setting in which the second reference signal is allocated in a part of the distributed type resources.

8. The radio transmission apparatus according to claim 6, wherein
the first communication system is LTE, the second communication system is LTE-A, and DVRB resources which are distribution resources defined by LTE are used as the distributed type resources, wherein the DVRB resources are one in which first and second half slots that are divided from each other in the time direction are hopped in the frequency direction are distributedly allocated at predetermined frequency intervals, and
the resource setting section is configured to perform resource setting in which the second reference signal is allocated in a part of the DVRB resources.

9. The radio transmission apparatus according to claim 8, wherein
the resource setting section is configured to perform resource setting in which the second reference signal is allocated in a resource with a specific resource ID of the DVRB resources.

10. The radio transmission apparatus according to claim 8, wherein the resource setting section is configured to perform resource setting in which the second-reference signal is allocated in the second half slot of the DVRB resources.

11. A radio communication method in a radio reception apparatus which performs communication by using a plurality of resources defined in a frequency-time domain, the radio communication method comprising the steps of:

acquiring distribution resource information for a second reference signal when the second reference signal for a second communication system is transmitted from a radio transmission apparatus in addition to transmitting a first reference signal for a first communication system, in a case where distributed type resources in which a resource unit defined in the frequency-time domain is divided in a time direction and distributedly allocated at predetermined frequency intervals are used as resources for the second reference signal;

receiving a signal containing the second reference signal transmitted from the transmission apparatus;

measuring a channel quality of a transmission channel by using the second reference signal that is allocated in the distributed type resources on the basis of the distribution resource information; and transmitting feedback information containing channel quality information indicative of the channel quality, to the transmission apparatus.

12. A radio communication method in a radio transmission apparatus which performs communication by using a plurality of resources defined in a frequency-time domain, the radio communication method comprising the steps of:

performing resources setting used in a case where distributed type resources in which a resource unit defined in the frequency-time domain is divided in a time direction and distributedly allocated at predetermined frequency intervals are used as resources for a second reference signal when the second reference signal for a second communication system is transmitted to a radio reception apparatus in addition to transmitting a first reference signal for a first communication system;

generating and allocating the second reference signal in the distributed type resources on the basis of the resource setting for the second reference signal;

transmitting a signal containing the second reference signal to the reception apparatus;

receiving feedback information informed from the reception apparatus, and acquire channel quality information contained in the feedback information; and performing scheduling containing at least one of frequency scheduling and an adaptive MCS (Modulation and Coding Scheme) control related to a transmission signal on the basis of the channel quality information.

\* \* \* \* \*